J. Mc Morries,
Knife & Fork.

No. 96,134.          Patented Oct. 26, 1869.

WITNESSES:
John J. Cheer
Balt'l DeLong

INVENTOR:
James Mc Morries
by
Wm. D. Baldwin
Atty

United States Patent Office.

JAMES McMORRIES, OF COLUMBUS, MISSISSIPPI.

Letters Patent No. 96,134, dated October 26, 1869.

IMPROVEMENT IN COMBINED KNIFE AND FORK.

The Schedule referred to in these Letters Patent and making part of the same.

*To all whom it may concern:*

Be it known that I, JAMES McMORRIES, of the city of Columbus, in the county of Lowndes, and State of Mississippi, have invented and produced a certain new and useful implement, which is a Combined Knife and Fork, whereby persons deprived of the use of one hand may be the better enabled to carve their food with one hand, and which implement I designate James McMorries's Independent Knife; and I do hereby declare that by referring to the accompanying drawings, and to the letters of reference marked thereon, a full, clear, and exact description of the same may be had from the following specification.

Figure 1:
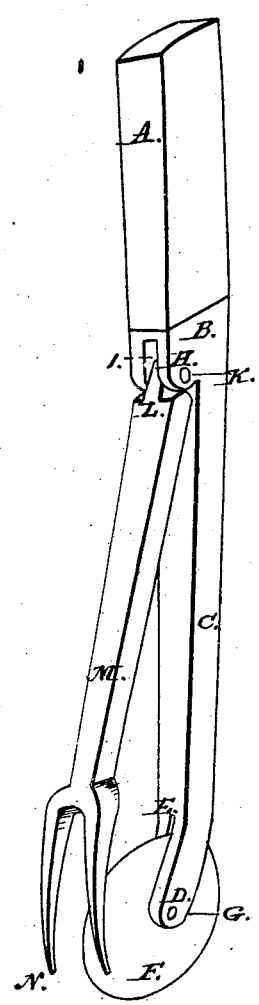
Figure 1 represents a perspective view of my device as preferably constructed.

I proceed to describe my invention, as illustrated by fig. 1.

A represents the handle of an ordinary knife or fork, from the socket B of which extends the shank C, curved at its extremity D, and bearing in a cleft, E, a circular blade or knife, F, revolving on a screw-pivot, G, removable, for the purpose of withdrawing the knife F, for cleaning or sharpening.

The thickness of the shank E is less than the width of the handle-socket B, from which it extends, thus leaving the shoulder H, in which is a cleft, I.

Inserted in this cleft I, and revolving as a hinge on a removable screw-pivot, K, is the stem L of a shank, M, having at its extremity a two-tined fork, as usually made. When the fork-shank M and the blade-shank C are pressed together, the extremity N of the fork coincides with the outer edge of the blade F.

To use my device, I grasp the handle A and insert the tines N in the food to be cut, then extending a finger down the back of the shank B, I thus press it toward the fork M, held stationary, and so holding the food to be cut until the blade F shall pass between the tines N, thus cutting the food.

Figure 2:
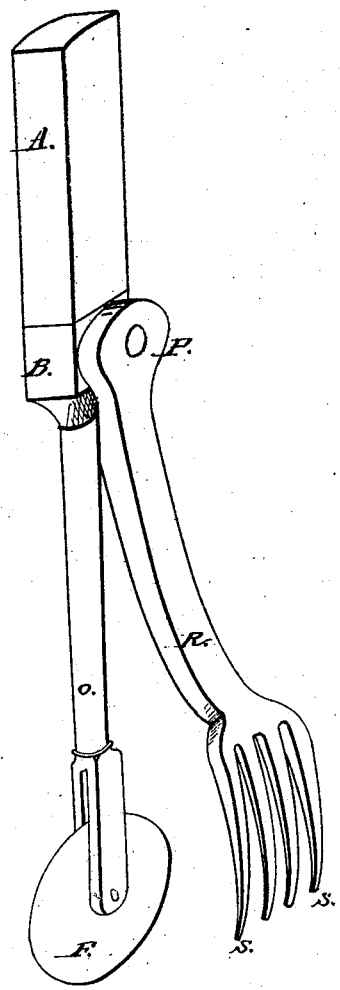
Figure 2 represents a perspective view of a device, substantially the same, but with a colorable variation of arrangement, which by some may be preferred.

By referring to fig. 2, it will be obvious that a modification of my device may be made, by fixing the revolving blade F in a shank, O, and affixing to the side of the handle-socket B, from which it extends, on a screw-pivot, P, perpendicular to the plane in which revolves the blade F, a fork, R, with its tines S at a distance from the track of the blade F, corresponding with the width which it is desired to cut the food, when, by grasping the handle A, and placing the tines S, of the fork R, in the food to be cut, the blade F may, by a simple movement of the shank O, operated by the handle A, be made to pass alongside the tines S S in a plane parallel with the tines, instead of perpendicular to them, as in fig. 1.

Claim.

What I claim as my invention, and desire to secure by Letters Patent of the United States, is—

The arrangement of the circular revolving blade F, operated toward the hinged fork-shank M, of fig. 1, and the arrangement of the circular revolving blade F, operated parallel with or alongside the pivoted fork R, of fig. 2, substantially as figured and described, and for the purposes set forth.

JAMES McMORRIES.

Witnesses:
 GEO. C. BROWN,
 H. C. WORTHINGTON.